United States Patent [19]

Pinch et al.

[11] Patent Number: 4,958,849
[45] Date of Patent: Sep. 25, 1990

[54] MOUNTING ASSEMBLY AND METHOD FOR A DAMPER

[75] Inventors: William D. Pinch, Dearborn; Douglas A. Dolengowski, Troy, both of Mich.; R. Kevin Longard, Brentwood, Tenn.; Raj K. Gopwani, Utica, Mich.

[73] Assignee: Saturn Corporation, Troy, Mich.

[21] Appl. No.: 368,686

[22] Filed: Jun. 19, 1989

[51] Int. Cl.⁵ .............................................. B60G 5/00
[52] U.S. Cl. ................................. 280/668; 248/632; 267/153
[58] Field of Search ............... 248/634, 632; 280/668, 280/673, 696, 660, 662; 188/321.11; 267/33, 220, 35, 153

[56] References Cited

U.S. PATENT DOCUMENTS

| | | | |
|---|---|---|---|
| 829,359 | 9/1906 | Weidmuller . | |
| 3,042,393 | 4/1959 | Heiss et al. | 267/35 |
| 4,248,454 | 2/1981 | Cotter | 280/668 |
| 4,260,176 | 4/1981 | Pacis | 280/668 |
| 4,618,130 | 10/1986 | Veglia | 267/153 |
| 4,681,304 | 7/1987 | Hassan | 267/153 X |
| 4,690,425 | 9/1987 | Kubo | 280/696 X |
| 4,711,463 | 12/1987 | Knable | 267/286 X |
| 4,779,855 | 10/1988 | Tanaka | 267/220 |
| 4,805,886 | 2/1989 | Hassan | 267/220 |
| 4,810,003 | 3/1989 | Pinch et al. | 280/668 |
| 4,817,983 | 4/1989 | Virani | 280/668 |

FOREIGN PATENT DOCUMENTS

| | | | |
|---|---|---|---|
| 3502579 | 7/1986 | Fed. Rep. of Germany | 280/668 |
| 104466 | 6/1982 | Japan | 280/668 |
| 2026131A | 1/1980 | United Kingdom . | |
| 2158549A | 11/1985 | United Kingdom . | |

*Primary Examiner*—J. Franklin Foss
*Attorney, Agent, or Firm*—A. Michael Tucker

[57] ABSTRACT

A cap having an opening mounted on the upper end of a damper includes an annular wall which encircles the cap opening and projects upwardly from an upper surface of the cap. A plurality of resilient tabs extends radially from the upper end surface of the annular wall. The lateral dimension of the tabs is slightly greater than an opening in support structure of a vehicle, e.g. a mounting tower. To quickly connect the upper end of the damper to the mounting tower, the mounted end cap is forced through the tower opening to compress the tabs. As the tabs clear the tower opening, each tab springs radially outwardly to retain the damper in place.

8 Claims, 1 Drawing Sheet

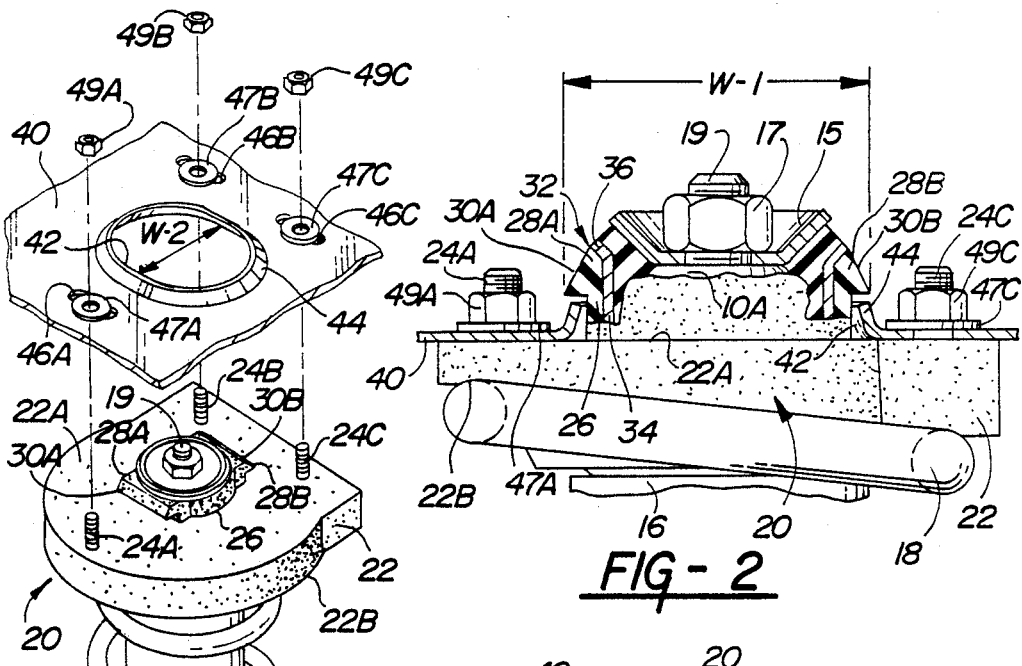
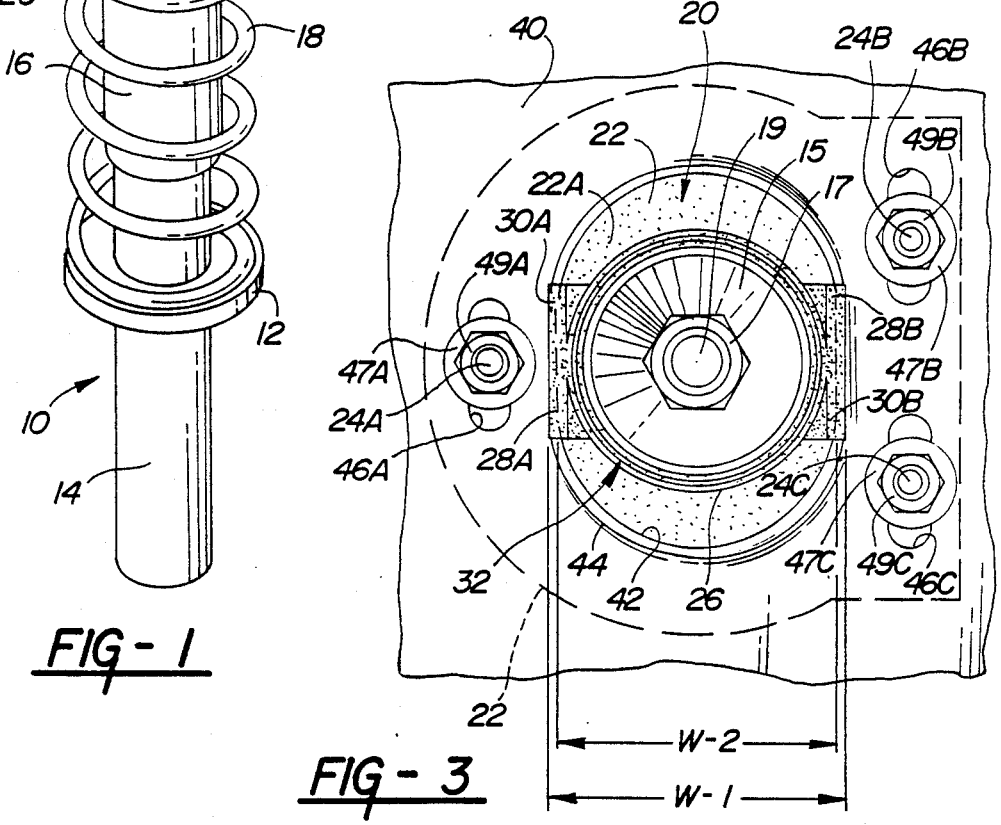

MOUNTING ASSEMBLY AND METHOD FOR A DAMPER

BACKGROUND OF THE INVENTION

1. Field of the Invention

The present invention is related to the assembly of a damper, e.g. a strut or shock absorber, in a vehicle. In particular, the present invention is concerned with a mounting assembly and method for quickly retaining the upper end of a damper to support structure of a vehicle.

2. Description of the Related Art

A typical vehicle suspension assembly includes a damper, e.g. a strut or shock absorber, mounted at each wheel. The lower end of the damper is connected to a road wheel assembly in any suitable manner. The upper end of the damper is mounted to support structure of the vehicle, usually in a mounting tower.

During a conventional strut-to-support structure assembly process, the damper is supported in an upright or inclined orientation with respect to a mounted wheel. Support for a damper can be accomplished by manual labor, a support bracket, etc. An end cap having upwardly projecting fasteners is mounted on the upper end of the damper. The fasteners are positioned through complementary openings in the mounting tower. Respective bolts are threaded on each of the fasteners.

It is desirable to reduce the amount of time required to initially mount the upper end of a damper to a mounting tower. In particular, it is desirable to temporarily and quickly connect the damper to the mounting tower and delay threading nuts onto fasteners at a later point in the assembly process.

SUMMARY OF THE INVENTION

The present invention includes an apparatus and a method for quickly securing the upper end of a damper to support structure of a vehicle, e.g. a mounting tower. The apparatus and method decreases the amount of time necessary to initially connect a damper to a mounting tower, thereby increasing the efficiency of assembly process.

In a preferred embodiment, the present invention includes a cap having an opening mounted on the upper end of a damper. The cap includes an annular wall which encircles the cap opening and projects upwardly from an upper surface of the cap. A plurality of resilient tabs extend radially from the upper end surface of the annular wall. The lateral dimension of the tabs is slightly greater than an opening in support structure of a vehicle, e.g. a mounting tower. To quickly connect the upper end of the damper to the mounting tower, the mounted end cap is forced through the tower opening to compress the tabs. As the tabs clear the tower opening, each tab springs radially outwardly to retain the damper in place.

In an alternate embodiment, each tab can include an inclined camming surface for engagement on a conical wall surrounding the tower opening.

BRIEF DESCRIPTION OF THE DRAWINGS

FIG. 1 is an exploded perspective view of the present mounting assembly secured to a strut prior to installation of the strut on a support structure in a vehicle.

FIG. 2 is a sectional view of the present mounting assembly after the strut has been installed on the support structure.

FIG. 3 is a top view of the mounting assembly and support structure illustrated in FIG. 2.

DETAILED DESCRIPTION OF A PREFERRED EMBODIMENT

A strut, indicated generally at 10, includes a support tube 14. The lower end of support tube 14 is adapted to be connected by any suitable means to a conventional road wheel (not illustrated). Strut 10 is a conventional strut that may be of the wet-build or cartridge-type such as disclosed in U.S. Pat. No. 4,276,971, issued July 7, 1981, titled "Vehicle Suspension Strut With Serviceable Shock Absorber" and hereby incorporated by reference.

A lower spring seat 12 is secured to the support tube 14 by any suitable means, including bearing means which would permit the rotation of the strut 10 relative to the spring seat 12 in the event that the road wheel is steerable. A conventional dust tube 16 is mounted about the upper portion of support tube 14. A helical suspension spring 18 is seated at its lower end on spring seat 12 and disposed around the dust cover 16. If desired, a resilient jounce bumper (not illustrated) can be incorporated with the strut 10. The upper end of spring 18 is placed in seating engagement with an annular upper mounting assembly 20, described below.

Mounting assembly 20 includes a cap 22 mounted on an upper end of strut 10. Preferably, cap 22 is a planar member molded from a resilient material, e.g. rubber, and includes a plurality of bolts projecting vertically from an upper surface 22A of cap 22. In the embodiment illustrated in the figures, three bolts 24A, 24B and 24C are provided on cap 22. Bolts 24A, 24B and 24C can be secured to the cap 22 in any suitable manner, including a metallic plate (not illustrated) embedded in cap 22 and having apertures for receiving bolts 24A, 24B and 24C. In an alternate embodiment, cap 22 can be formed from a metallic member coated with a resilient material. A lower surface 22B of cap 22 provides a seat for spring 18.

A central opening (not illustrated) is provided in cap 22 for receiving a piston rod 19 of strut 10. An annular wall 26, formed integrally with cap 22, is concentrically positioned about the central opening of the cap 22. Wall 26 terminates in a pair of opposed tabs 28A and 28B. Each tab 28A and 28B is formed of a resilient material and preferably includes a sloped surface 30A and 30B, respectively, angularly oriented with respect to the wall 26. In an undeformed or relaxed position, the maximum lateral width between sloped surfaces 30A and 30B is indicated at W-1. If desired, a stiffener 32 formed from a rigid material can be provided in wall 26. Stiffener 32 includes a main cylindrical wall 34 and terminates in an outwardly projecting conical wall 36 having a circumferential end surface which does not protrude beyond resilient sloped surfaces 30A and 30B.

The present invention provides a mounting assembly 20 and method for temporarily and quickly connecting a strut 10 to support structure in a vehicle. In many applications, the vehicle includes a mounting tower for receiving a strut 10. Generally, a mounting tower includes a planar surface 40 as illustrated in FIG. 1. The planar surface 40 includes an opening 42, illustrated as a slot or elongated aperture. If desired, an upwardly projecting conical wall 44 is provided about opening 42.

The maximum width or lateral dimension of opening 42 is indicated at W-2 in the figures. In this embodiment, W-2 is less than W-1. The interior surface of wall 44 provides a camming surface for sloped surfaces 30A and 30B as described below. Slots 46A, 46B and 46C are provided in surface 40 to receive respective bolts 24A, 24B and 24C. To retain bolts 24A, 24B and 24C to surface 40, respective washers 47A, 47B and 47C and nuts 49A, 49B and 49C are provided.

For assembly of the upper end of strut 10 to support structure of a vehicle, the piston rod 19 is inserted in the cap central opening and the spring 18 seats on the bottom surface 22B of the cap 22. The cap 22 is retained on the strut 10 by a nut 17 threaded into tight engagement with a washer 15. Next, the cap 22 and strut 10 are positioned beneath the mounting tower planar surface 40 so that each bolt 24A, 24B, 24C is aligned with its respective slot 46A, 46B, 46C. The cap 22 is inserted through opening so that sloped surfaces 30A and 30B engage the lower interior surface of wall 44. As the wall 26 is forced through opening 42, resilient tabs 28A and 28B are compressed. Once the tabs 28A and 28B have passed through opening 42, the tabs 28A and 28B spring radially outwardly in recovery to their original shape to quickly and temporarily connect the strut 10 to the vehicle body. At this position, the bottom surface of tabs 28A and 28B are supported by wall 44. At a later point in an assembly process, nuts 49A, 49B and 49C can be threaded onto respective bolts 24A, 24B and 24C.

The present mounting assembly 20 provides a quick snap-on connection of the strut 10 to the vehicle body. The mounting assembly 20 also facilitates removal of the strut 10 and cap 22 from the vehicle. To remove the strut 10, the tabs 28A and 28B are compressed and the strut 10 is moved vertically downwardly from the tower planar surface 40.

Various embodiments of the present resilient tabs 28A and 28B are easily envisioned. For example, an annular resilient flange can be provided at the termination of wall 26. Such a flange would cooperate with a conical wall 44 of a circular opening. The diameter of the flange would be slightly greater than the diameter of the opening. When the cap 22 and strut 10 are inserted through the opening, the flange would compress until it cleared the opening. In another embodiment, a plurality of tabs could be provided at various locations about the wall to cooperate with a complementary wall of a mounting tower.

Although the present invention has been described with reference to preferred embodiments, workers skilled in the art will recognize that changes may be made in form and detail without departing from the spirit and scope of the invention.

The embodiments of the invention in which an exclusive property or privilege is claimed are defined as follows:

1. A cap for receiving and mounting a strut to vehicle support structure having an opening, comprising:
   (a) a planar body having upper and lower surfaces and an opening therethrough;
   (b) an annular wall encircling the opening and projecting from the upper surface of the body; and
   (c) resilient tab means provided at the termination of the wall, the tab means having a lateral dimension greater than the complementary dimension of the opening in the vehicle support structure and including a sloped surface for engagement with the boundary of the opening in the vehicle support structure.

2. The cap as specified in claim 1 wherein the tab means comprises a plurality of tabs extending radially from the wall.

3. The cap as specified in claim 1 wherein the body, wall and tabs are integrally molded from a resilient material.

4. A mounting assembly for connecting a strut to support structure in a vehicle, the support structure having an opening defined by a conic wall inclined upwardly from a lower surface to provide a camming surface, the mounting assembly comprising:
   (a) a planar body having an opening for receiving the strut;
   (b) an annular wall projecting vertically from the body and concentric with the body opening; and
   (c) resilient tab means provided at the termination of the annular wall having an undeformed lateral dimension greater than the support structure opening,
   whereby as the planar body is connected to the support structure, the camming surface of the conic wall compresses the tab means to permit the tab means to pass through the support structures.

5. The mounting assembly as specified in claim 4 wherein:
   (a) the support structure opening is an elongated aperture; and
   (b) the tab means comprises a pair of tabs provided on opposite sides of the annular wall having a lateral dimension greater than the width of the elongated aperture.

6. The mounting assembly as specified in claim 5 including a sloped surface at an upper surface of the tab means for engagement with the conic wall camming surface.

7. A method for retaining a strut to support structure of a vehicle, the method comprising the steps of:
   (a) providing a planar body having an opening for receiving the strut;
   (b) providing an annular wall projecting from the planar body and concentric to the opening;
   (c) providing radially extending resilient tab means on the annular wall;
   (d) providing a plurality of fastening means projecting from the planar body;
   (e) aligning the planar body with respective openings in the support structure for receiving the annular wall and fastener means; and
   (f) urging the cap toward the support structure to compress the tab means and permit the tab means to pass through a respective opening.

8. The method as specified in claim 7 including the step of securing the fastening means to the support structure.

* * * * *